United States Patent
Park et al.

(10) Patent No.: US 12,466,267 B2
(45) Date of Patent: Nov. 11, 2025

(54) SYSTEM AND METHOD FOR CONTROLLING CHARGE/DISCHARGE USING PADDLE BRAKING

(71) Applicants: Hyundai Motor Company, Seoul (KR); Kia Corporation, Seoul (KR)

(72) Inventors: Yong Seok Park, Bucheon-Si (KR); Jin Woo Yang, Seongnam-Si (KR); Seung Jae Yoo, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 416 days.

(21) Appl. No.: 17/948,676

(22) Filed: Sep. 20, 2022

(65) Prior Publication Data

US 2023/0226921 A1     Jul. 20, 2023

(30) Foreign Application Priority Data

Jan. 14, 2022 (KR) ........................ 10-2022-0005636

(51) Int. Cl.
*B60L 1/00* (2006.01)
*B60L 7/18* (2006.01)
*B60L 50/60* (2019.01)

(52) U.S. Cl.
CPC .................................. *B60L 7/18* (2013.01); *B60L 1/00* (2013.01); *B60L 50/60* (2019.02)

(58) Field of Classification Search
CPC .. B60L 1/00; B60L 1/003; B60L 15/20; B60L 2210/10; B60L 2240/42; B60L 2240/54; B60L 2250/26; B60L 2250/28; B60L 50/60; B60L 53/00; B60L 58/10; B60L 58/12; B60L 7/10; B60L 7/18; B60T 13/74; B60T 2270/60; B60Y 2200/91; Y02T 10/70; Y02T 10/7072
See application file for complete search history.

(56) References Cited

U.S. PATENT DOCUMENTS

| | | | | |
|---|---|---|---|---|
| 2016/0107525 | A1* | 4/2016 | Min | B60L 3/0046 701/29.2 |
| 2020/0148208 | A1* | 5/2020 | Choi | B60W 30/18127 |

FOREIGN PATENT DOCUMENTS

| | | |
|---|---|---|
| JP | 6149720 B | 6/2017 |
| KR | 10-2016-0024114 A | 3/2016 |

* cited by examiner

*Primary Examiner* — Charles J Han
(74) *Attorney, Agent, or Firm* — Morgan Lewis & Bockius LLP

(57) ABSTRACT

A system and method for controlling charge and discharge using paddle braking, which is capable of improving energy efficiency of an entire system by scheduling other loads except for a drive motor and using some of the energy generated by regenerative braking to operate the loads according to the scheduling thereof without storing it in a battery, includes an input unit configured to input a braking command to a vehicle, a regenerative braking unit configured to perform driving and regenerative braking of the vehicle, a load unit including a plurality of other loads using electrical energy charged in a battery, and a control unit configured to receive the braking command and control braking and regenerative braking.

7 Claims, 4 Drawing Sheets

SYSTEM AND METHOD FOR CONTROLLING CHARGE/DISCHARGE USING PADDLE BRAKING

CROSS-REFERENCE TO RELATED APPLICATION

The present application claims priority to Korean Patent Application No. 10-2022-0005636, filed on Jan. 14, 2022, the entire contents of which is incorporated herein for all purposes by this reference.

BACKGROUND OF THE PRESENT DISCLOSURE

Field of the Present Disclosure

The present disclosure relates to a system for controlling charging and discharging of batteries, and more particularly, to a system and method for controlling charge and discharge using paddle braking, which is configured for improving energy efficiency of an entire system by scheduling other loads except for a drive motor and operating the loads according to the scheduling thereof without storing in a battery some of the energy generated by regenerative braking in response to input of paddle braking.

Description of Related Art

Regenerative braking converts the kinetic energy of a motor into electrical energy to perform braking. An electrified vehicle utilizes a drive motor to convert kinetic energy into electrical energy by regenerative braking and charges a battery with the electrical energy, improving the energy efficiency of the vehicle.

Regenerative braking occurs when a vehicle is decelerated by releasing an accelerator pedal, by pressing a brake pedal, i.e., a foot brake by a driver, or by use of a paddle shift generally.

However, when using a battery that has been charged by regenerative braking, the loss of energy generated during the charging and discharging processes of the battery is still unavoidable.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a system and method for controlling charge and discharge using paddle braking that substantially obviate one or more problems due to limitations and disadvantages of the related art.

Various aspects of the present disclosure are directed to providing a system for controlling charge and discharge using paddle braking, which is capable of improving energy efficiency of an entire system by scheduling other loads except for a drive motor and using some of the energy generated by regenerative braking to operate the loads according to the scheduling thereof without storing it in a battery.

Various aspects of the present disclosure are directed to providing a method of controlling charge and discharge using paddle braking, which is capable of improving energy efficiency of an entire system by scheduling other loads except for a drive motor and using some of the energy generated by regenerative braking to operate the loads according to the scheduling thereof without storing it in a battery.

The present disclosure is not limited to the above-mentioned objects, and other objects of the present disclosure may be clearly understood by those skilled in the art to which an exemplary embodiment of the present disclosure pertains from the following description.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, there is provided a system for controlling charge and discharge using paddle braking, which includes an input unit configured to input a braking command to a vehicle, a regenerative braking unit configured to perform driving and regenerative braking of the vehicle, a load unit including a plurality of other loads using electrical energy charged in a battery, and a control unit configured to receive the braking command and control the driving and the regenerative braking, wherein the control unit is configured to divide a time section related to the braking command into a plurality of sections including a regenerative braking charge section and a paddle braking release section, and controls the electrical energy generated by the regenerative braking to be directly used for the operation of at least one of the plurality of other loads in the regenerative braking charge section between a time when actual regenerative braking starts and a time when the braking command is released and in the paddle braking release section between the time when the braking command is released and a time when actual paddle braking release command is confirmed among the plurality of sections.

In another aspect of the present disclosure, there is provided a method of controlling charge and discharge using paddle braking, which includes setting an operation schedule of a plurality of loads included in a vehicle, determining whether a braking command is input, controlling an operation of a load 1 of the plurality of loads according to the operation schedule when it is determined that the braking command is input, determining whether the braking command is confirmed, controlling an operation of a load 2 of the plurality of loads according to the operation schedule when it is determined that the braking command is confirmed, determining whether the braking command is release, controlling an operation of a load 3 of the plurality of loads according to the operation schedule thereof when it is determined that the braking command is released, determining whether a drive motor is in a discharge mode, and controlling an operation of a load 4 of the plurality of loads when the control unit concludes that the drive motor is in the discharge mode.

It is to be understood that both the foregoing general description and the following detailed description of the present disclosure are exemplary and explanatory and are intended to provide further explanation of the present disclosure as claimed.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
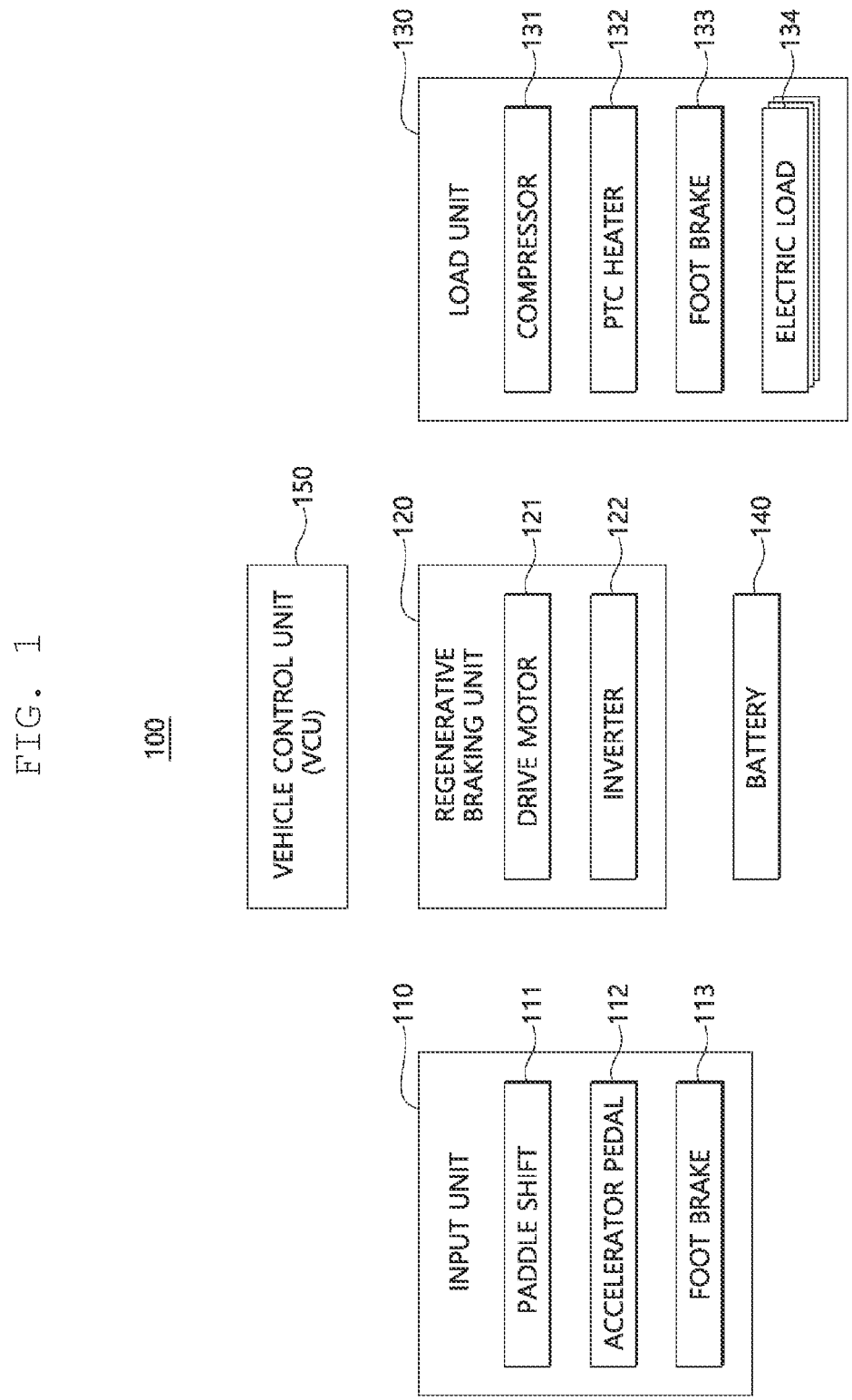
FIG. 1 illustrates an exemplary configuration of a system for controlling charge and discharge using paddle braking according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

To fully understand the present disclosure, the operational advantages of the present disclosure, and the objects achieved by the practice of the present disclosure, reference may be made to the accompanying drawings for illustrating exemplary embodiments of the present disclosure and the contents described in the accompanying drawings.

Hereinafter exemplary embodiments of the present disclosure will be described in detail with reference to the accompanying drawings. Throughout the present disclosure, like reference numerals refer to like elements.

The present disclosure is applied to a system in which, after braking input of a paddle shift (hereinafter, referred to as "paddle braking input"), there is a time interval (hereinafter, referred to as "braking intention prediction section") during which actual paddle braking input is confirmed.

The loss of energy occurs during charging and discharging of a battery. Therefore, the present disclosure is directed to providing a technology that improves energy efficiency of an entire system by use of the electrical energy generated by regenerative braking in response to input of paddle braking to operate other loads according to the scheduling thereof without storing it in the battery, and that minimizes the use of energy by loads other than a drive motor in the braking intention prediction section and then compensates for it in a section where regenerative braking occurs (hereafter, referred to as "regenerative braking charge section").

In the following description, the paddle braking input means that a driver activates the paddle shift to instruct deceleration. However, because the present disclosure is directed to providing efficient use of the energy generated by regenerative braking, it should be noted in advance that the present disclosure may be applied not only to regenerative braking by paddle braking, but also to regenerative braking that occurs when an accelerator pedal is released or a brake pedal is pressed.

FIG. 1 illustrates an exemplary configuration of a system for controlling charge and discharge using paddle braking according to an exemplary embodiment of the present disclosure.

Referring to FIG. 1, the system for controlling charge and discharge using paddle braking, which is designated by reference numeral 100, includes an input unit 110, a regenerative braking unit 120, a load unit 130, a battery 140, and a vehicle control unit 150.

The input unit 110 is for inputting a braking command to a vehicle by a driver, and includes a paddle shift 111, an accelerator pedal 112, and a foot brake 113. To input the braking command to the vehicle, the driver performs one of an operation of applying a force to the (-) paddle shift 111, an operation of releasing the accelerator pedal 112, and an operation of applying a pressure to the foot brake 113, so that the vehicle activates regenerative braking in response to the braking command.

The regenerative braking unit 120 is in charge of driving of the vehicle on the one hand, and performs regenerative braking in response to the braking command by the driver to charge the battery 140 with electrical energy on the other hand. The regenerative braking unit 120 includes a drive motor 121 and an inverter 122.

The load unit 130 refers to a device that utilizes the electrical energy charged in the battery 140. For example, other loads may include a compressor 131, a positive temperature coefficient (PTC) heater 132, a DC/DC converter 133, and a plurality of electric loads 134. The drive motor 121 also acts as a load for the battery 140, but is not included in the target of a schedule. Accordingly, it is assumed that the remaining loads except for the drive motor 121 are other loads.

The battery 140 is a high-voltage battery that supplies electrical energy necessary for driving of the drive motor 121 and power generation, and is a source of energy necessary for the operation of other loads.

The vehicle control unit 150 receives the braking command applied from the input unit 110 to control braking and regenerative braking. For convenience of explanation, it is assumed that the braking command by the paddle shift is referred to as a paddle braking command, the braking command by the foot brake is referred to as a foot braking command, and the braking command by releasing the accelerator pedal is referred to as an accelerator pedal braking command.

Because configurations and functions of the input unit 110, the regenerative braking unit 120, the load unit 130, and the battery 140 except for the function of the vehicle control unit 150 are general and already known, these will be omitted here. However, the function of the vehicle control unit 150 will be described below.

Figure 2:
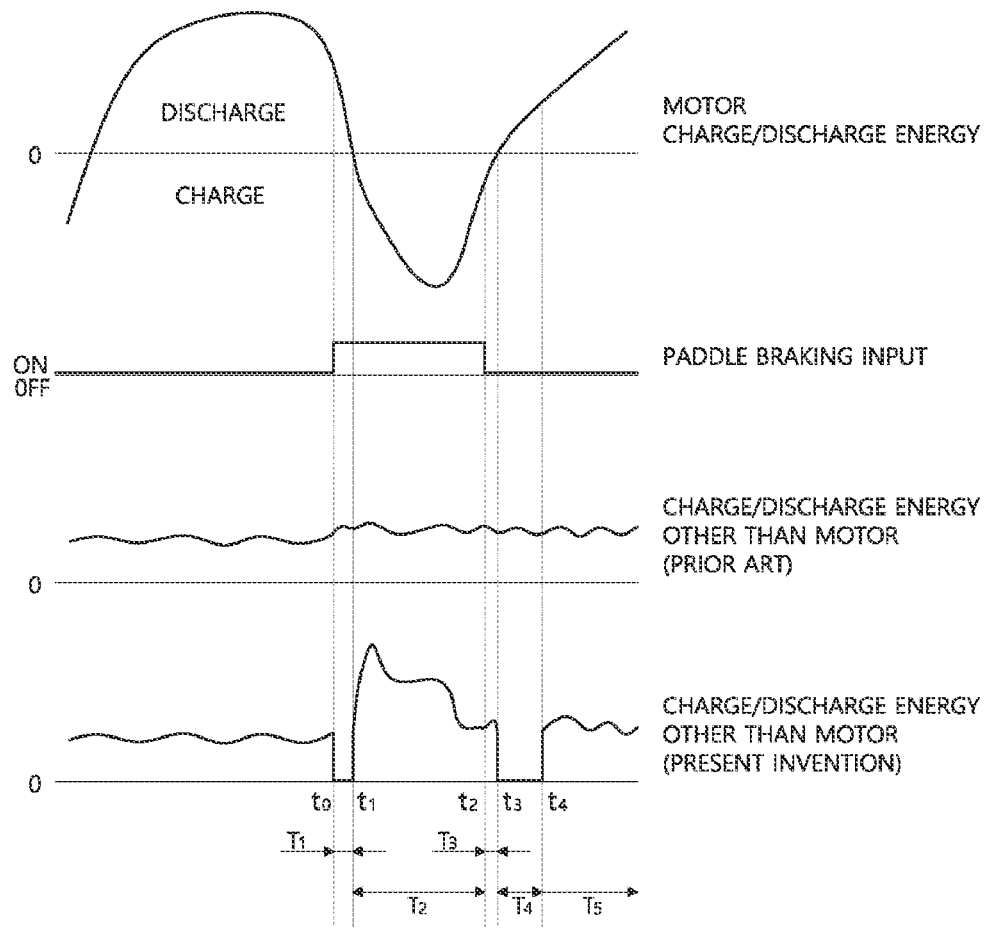
FIG. 2 illustrates charge and discharge energy of a motor, input of paddle braking, and a change in charge and discharge energy other than the motor over time.

FIG. 2 illustrates charge and discharge energy of the motor, input of paddle braking, and a change in charge and discharge energy other than the motor over time.

To make it easier to understand the characteristics of the present disclosure, FIG. 2 illustrates the change in charge and discharge energy other than the motor over time to compare the related art (the second signal from the bottom) and the present disclosure (the lowermost signal).

Referring to the second signal from the top in FIG. 2, a certain time interval from when the driver inputs a paddle braking command ($t_0$) to a time when the drive motor is switched from a charge mode to a discharge mode ($t_4$) is divided into four sections: a braking intention prediction section ($T_1$), a regenerative braking charge section ($T_2$), a paddle braking release section ($T_3$), and a drive motor discharge transition section ($T_4$).

The braking intention prediction interval ($T_1$) is a section between a time when the driver inputs the paddle braking command ($t_0$) and a time when actual regenerative braking starts ($t_1$), and the regenerative braking charge section ($T_2$) is a section between the time when the actual regenerative braking starts ($t_1$) and a time when the driver releases the paddle braking command ($t_2$). The paddle braking release section ($T_3$) is a section between the time when the driver releases the paddle braking command ($t_2$) and a time when an actual paddle braking release command is confirmed ($t_3$), and the driving motor discharge transition section ($T_4$) is a section between the time when an actual paddle braking release command is confirmed ($t_3$) and a time when the drive motor is switched from a charge mode to a discharge mode ($t_4$).

Figure 3:
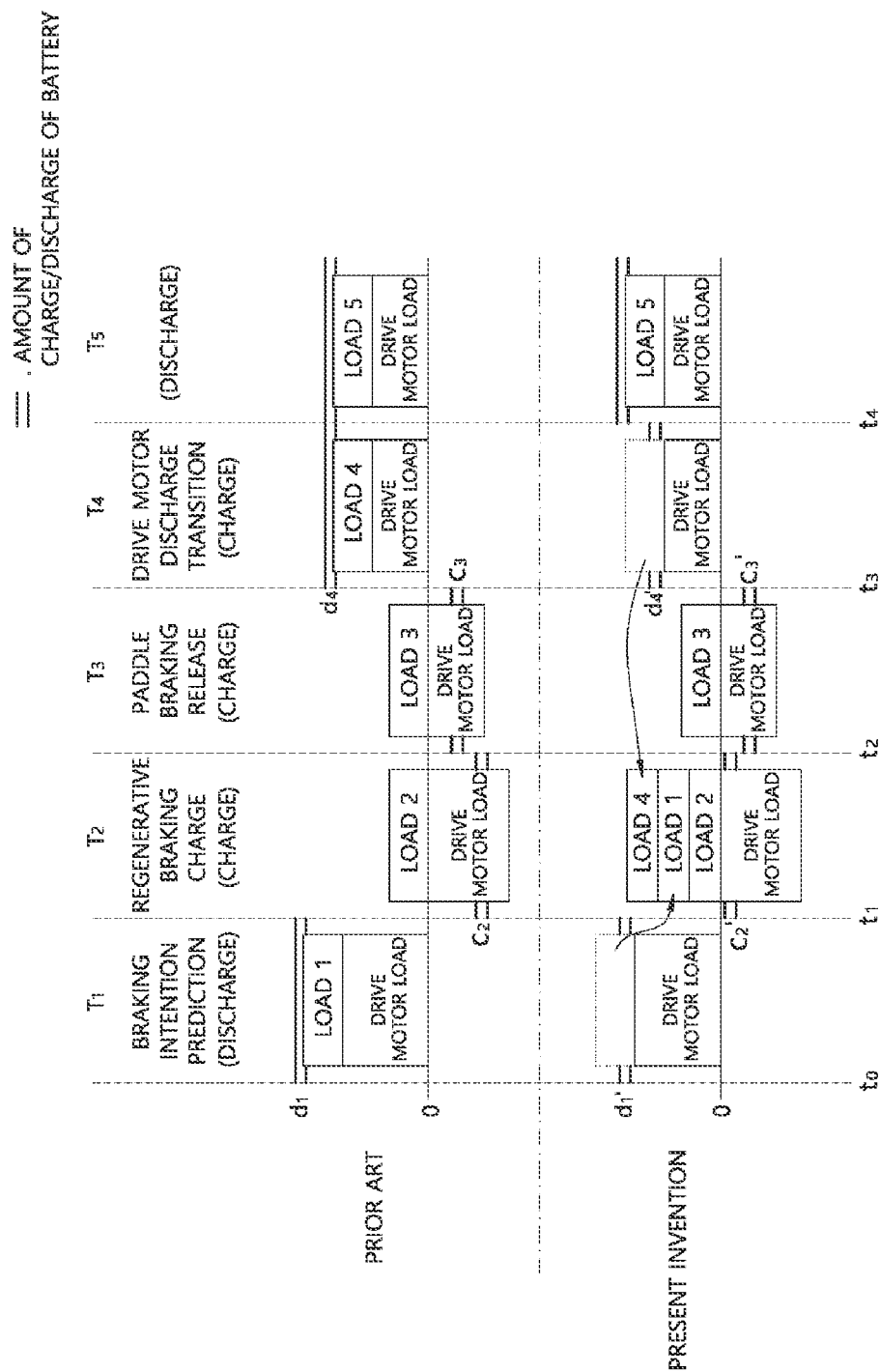
FIG. 3 illustrates an example of charge and discharge characteristics in four sections of FIG. 2.

FIG. 3 illustrates an example of charge and discharge characteristics in the four sections of FIG. 2.

FIG. 3 illustrates four distinct sections at the top thereof, the charge and discharge characteristics of the present disclosure at the bottom thereof, and the charge and discharge characteristics of the related art in the middle thereof.

Referring to an example of the related art illustrated in the middle of FIG. 3, it can be seen that in the related art other loads are allocated to the respective sections and any of the other loads always operates in each section.

Referring to an example of the present disclosure illustrated at the bottom of FIG. 3, it can be seen that in an exemplary embodiment of the present disclosure no load operates in at least one section and a plurality of loads operate in a certain section.

As described above, the present disclosure improves the energy efficiency of the entire system by scheduling the other loads to be operated in each section in advance.

Referring to FIG. 3, in the braking intention prediction section ($T_1$; $t_0$ to $t_1$), the operation timing of a plurality of other loads (hereinafter, referred to as other loads) forming part or all of the load unit 130 except for the drive motor 121 that performs charge and discharge by acceleration/deceleration is changed to reduce the amount of discharge of the battery 140 compared to the related art, minimizing the loss of energy due to discharging. In the braking intention prediction section ($T_1$), it can be seen that the load 1 and the drive motor as a load use the discharge energy of the battery 140 ($d_1$) in the related art, but the drive motor as a load utilizes the discharge energy of the battery 140 and the operation of the load 1 is prohibited to thereby reduce the amount of discharge energy of the battery 140 ($d_1'$) in an exemplary embodiment of the present disclosure. That is, because the discharge energy is $d_1 > d_1'$ in the braking intention prediction section ($T_1$), the loss of energy due to discharging is less in an exemplary embodiment of the present disclosure than in the related art.

In the regenerative braking charge section ($T_2$), the electrical energy generated by regenerative braking is used directly without being stored in the battery 140, and the drive motor 121, the load 2, and the load 1 whose operation timing is changed in the braking intention prediction section ($T_1$; $t_0$ to $t_1$) are discharged. Furthermore, an exemplary embodiment in which the load 4 expected to operate in the drive motor discharge transition section ($T_4$) is operated using the discharge energy of the battery 140 is also possible. In the regenerative braking charge section ($T_2$), it can be seen that the amount of electrical energy ($c_2$) charged by the load 2 and the drive motor as a load using the discharge energy of the battery 140 in the related art is greater than the amount of electrical energy ($c_2'$) charged by operating the drive motor as a load, the load 1, the load 2, and the load 4 in an exemplary embodiment of the present disclosure ($c_2 > c_2'$). That is, because the amount of electrical energy charged in the regenerative braking charge section ($T_2$) is less in an exemplary embodiment of the present disclosure than in the related art, the amount of energy lost due to charging in the present section is also reduced.

The vehicle control unit 150 schedules the drive motor and at least one load (load 1, 2, or 4) for operation thereof in the regenerative braking charge section ($T_2$), wherein the load (load 4) operated in the regenerative braking charge section ($T_2$) is a load to be operated in the drive motor discharge transition section ($T_4$). The vehicle control unit 150 schedules the load (load 4) to be operated in the drive motor discharge transition section ($T_4$) to prohibit the operation of the load in the drive motor discharge transition section ($T_4$) or to compensate for the incomplete operation of the load in the regenerative braking charge section ($T_2$).

Although FIG. 3 illustrates that the load 1 is delayed without operating in the braking intention prediction section ($T_1$) and is operated in the regenerative braking charge section ($T_2$), an exemplary embodiment in which the load 1 is operated in the braking intention prediction section ($T_1$) is also possible.

In the paddle braking release section ($T_3$), the drive motor 121 is just before it is switched to the discharge mode. Therefore, the present disclosure is the same as the related art in that the load 3 and the drive motor as a load are operated using the electrical energy generated by operation in the charge mode and regenerative braking. That is, in the related art ($c_3$) and the present disclosure ($c_3'$), the amount of electrical energy charged in the paddle braking release section ($T_3$) is the same ($c_3 = c_3'$).

In the drive motor discharge transition section ($T_4$), the drive motor 121 is switched to the discharge mode and the load utilizes the discharge energy, but the load 4, which has been operated in the related art, is not operated in an exemplary embodiment of the present disclosure. Therefore, the amount of consumption of discharge energy ($d_4'$) in an exemplary embodiment of the present disclosure is less than the amount of consumption of discharge energy ($d_4$) in the related art ($d_4 > d_4'$). Therefore, it may be seen that the loss of electrical energy due to discharging in the present section is less in an exemplary embodiment of the present disclosure than in the related art.

In the section ($T_5$) after the drive motor discharge transition section ($T_4$), the same process is performed in the related art and the present disclosure.

Each of the loads 1 to 5 described in FIG. 3 includes at least one of the compressor 131, the PTC heater 132, the DC/DC converter 133, and the plurality of electric loads 134 which are other loads forming the load unit 130.

Figure 4:
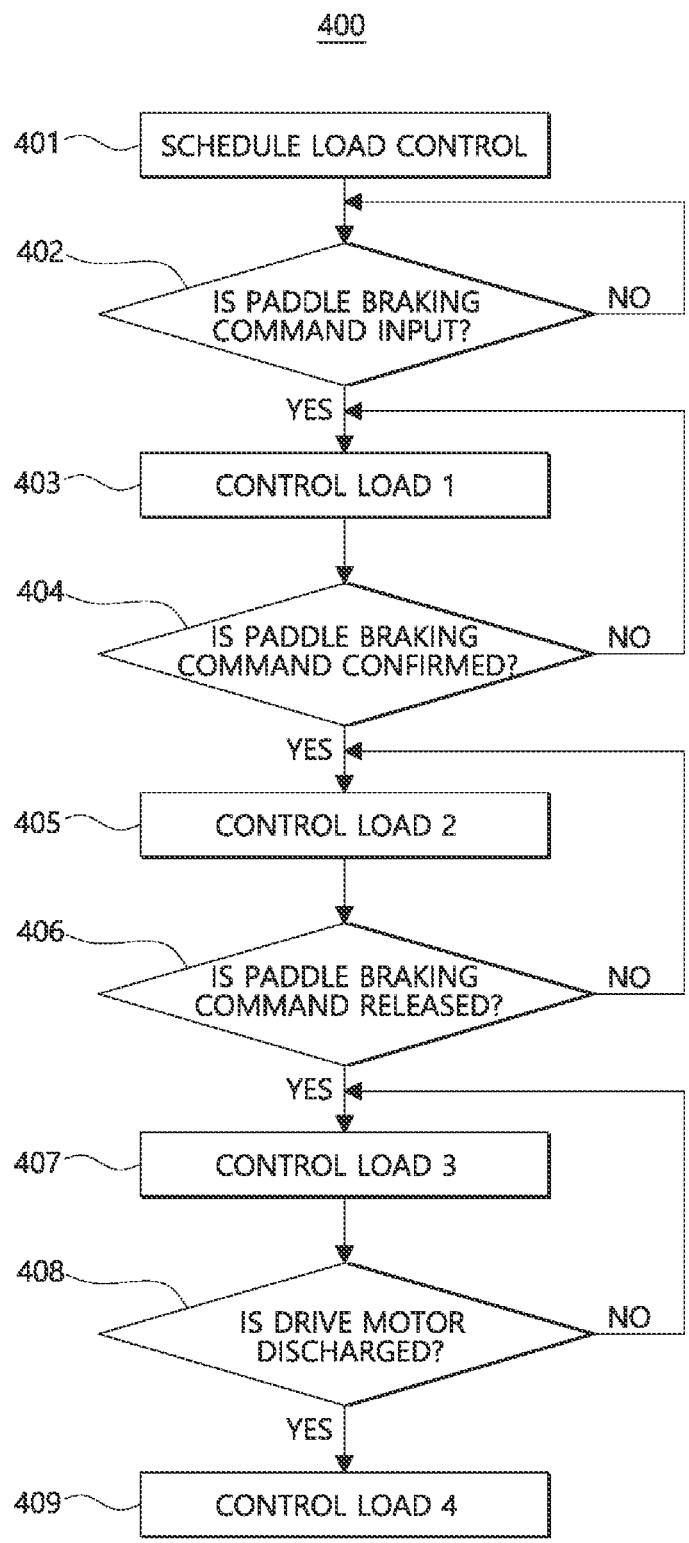
FIG. 4 illustrates an exemplary embodiment of a method of controlling charge and discharge using paddle braking according to an exemplary embodiment of the present disclosure.

FIG. 4 illustrates an exemplary embodiment of a method of controlling charge and discharge using paddle braking according to an exemplary embodiment of the present disclosure.

Referring to FIG. 4, the method of controlling charge and discharge using paddle braking, which is designated by reference numeral 400, according to an exemplary embodiment of the present disclosure includes a step of setting an operation schedule of a plurality of loads included in a vehicle (401), a step of determining whether a driver inputs a paddle braking command using a paddle shift (402), a step of controlling an operation of a load 1 according to the operation schedule thereof when it is determined that the driver inputs the paddle braking command (Yes in step 402) (403), a step of determining whether the paddle braking command input by the driver is confirmed (404), a step of controlling an operation of a load 2 according to the operation schedule thereof when it is determined that the paddle braking command input by the driver is confirmed (Yes in step 404) (405), a step of determining whether the paddle braking command is released (406), a step of controlling an operation of a load 3 according to the operation schedule thereof when it is determined that the paddle braking command is released (Yes in step 406) (407), a step of determining whether a drive motor is in a discharge mode (408), and a step of controlling an operation of a load 4 when it is determined that the drive motor is in the discharge mode (Yes in step 408) (409).

The method of controlling charge and discharge using paddle braking 400 according to an exemplary embodiment of the present disclosure illustrated in FIG. 4 is performed by a vehicle control unit 150.

Here, the loads 1 to 5 include at least one of a plurality of other loads, i.e., a compressor 131, a PTC heater 132, a DC/DC converter 133, and a plurality of electric loads 134 which form a load unit 130. The load 1 corresponds to a load performed in a braking intention prediction section ($T_1$), the load 2 corresponds to a load performed in a regenerative braking charge section ($T_2$), the load 3 corresponds to a load performed in a paddle braking release section ($T_3$), and the load 4 corresponds to a load performed in a drive motor discharge transition section and a subsequent section ($T_4$ and $T_5$) as illustrated in FIG. 3.

For example, the load 1 may include a drive motor 121 as a load and one load, the load 2 may include the drive motor 121 as a load and two loads, and the load 3 may include the drive motor 121 as a load and one load. The two loads in the load 2 may be other loads to be performed in the drive motor discharge transition section.

In another example, the load 1 may include only a drive motor 121 as a load, the load 2 may include the drive motor 121 as a load and at least two loads, and the load 3 may include the drive motor 121 as a load and one load.

The step of controlling an operation of a load 1 (403) performs one of the following operations: the load 1 is operated or the load 1 is not operated.

However, for the load 2, to maximize an effect of the present disclosure, it is preferable to select at least three operating loads other than the drive motor 121. This enables the amount of electrical energy generated by regenerative braking to charge the battery 140 to be minimized, minimizing the loss of energy loss due to charging. When other loads included in the load 2 are not sufficiently operated, the other loads will be additionally performed according to the scheduling thereof in the subsequent section ($T_5$).

When it is determined that the driver does not input the paddle braking command (No in step 402), step 402 is performed. When it is determined that the paddle braking command input by the driver is not confirmed (No in step 404), the step of controlling an operation of a load 1 (403) is performed. When it is determined that the paddle braking command is not released (No in step 406), the step of controlling an operation of a load 2 (405) is performed. When it is determined that the drive motor is not in the discharge mode (No in step 408), the step of controlling an operation of a load 3 (407) is performed.

The vehicle control unit 150 may store the following information in a memory, for example, an amount of reduction in electrical energy by the operation control of the load 1 after controlling the operation of the load 1 (403), an amount of increase in electrical energy by the operation control of the load 2 after controlling the operation of the loads 2 and 3 (405 and 407), an amount of increase in electrical energy by the operation control of the load 4 after controlling the operation of the load 4 (409), and the like.

The information stored in the memory may be used to determine the type and number of other loads allocated to each section when scheduling the other loads, or to manage compensation control of other loads that have insufficient operating time.

The difference in electrical energy between when the method of controlling charge and discharge using paddle braking 400 according to an exemplary embodiment of the present disclosure is performed and when the conventional method is performed may be accumulated and stored in the memory.

As is apparent from the above description, the system and method for controlling charge and discharge using paddle braking according to an exemplary embodiment of the present disclosure may reduce the loss of regenerative braking energy due to the charging and discharging of the battery by use of the characteristics of the paddle braking to delay the schedulable high-voltage battery discharge element (low-voltage battery charging, air conditioning) while the input of the paddle braking is in progress and to perform the delayed high-voltage battery discharge element (up to the amount of discharge required in the future) after entering the paddle braking in which the battery is charged by regenerative braking. The present disclosure is not limited to the above-mentioned effects, and other effects of the present disclosure may be clearly understood by those skilled in the art to which an exemplary embodiment of the present disclosure pertains from the above description.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A system for controlling charge and discharge using paddle braking, the system comprising:
   an input unit inputting a braking command to a vehicle;
   a regenerative braking unit performing driving and regenerative braking of the vehicle;
   a load unit including a plurality of auxiliary loads using electrical energy charged in a battery; and
   a control unit receiving the braking command and controlling the driving and the regenerative braking, wherein the control unit performs:
      dividing a time section into a plurality of sections including a discharge section and a regenerative braking section;
      in response to receiving the braking command input, changing an operation time of at least one of the plurality of auxiliary loads, which operates during the discharge section among the plurality of sections, to the regenerative braking section among the plurality of sections, so that the electrical energy generated by the regenerative braking is directly used by an operation of at least one of the plurality of auxiliary loads without being stored in a battery; and
   wherein the plurality of sections comprises:
      a braking intention prediction section which is a section between a braking starting time and a first time when actual regenerative braking starts;
      a regenerative braking charge section which is a section between the first time and a second time when a driver releases a paddle braking command;
      a paddle braking release section which is a section between the second time and a third time when an actual paddle braking release command is confirmed; and
      a driving motor discharge transition section which is a section between the third time and a braking ending time, and
      wherein the regenerative braking charge section and the paddle braking release section are sections that the regenerative braking is performed.

2. The system of claim 1, wherein the braking command is determined by at least one of an operation of a (-) paddle shift, a release operation of an accelerator pedal, and an operation of a foot brake.

3. The system of claim 1, wherein the system changes an operation time of a first auxiliary load to be operated in the braking intention prediction section to within the regenerative braking charge section.

4. The system of claim 1, wherein the system changes an operation time of a second auxiliary load to be operated in the driving motor discharge transition section to within the regenerative braking charge section.

5. The system of claim 1, wherein the system causes only a drive motor to be operated in the braking intention prediction section, in which case operation of the drive motor is scheduled so that the drive motor is operated by directly using discharge energy of the battery.

6. The system of claim 5, wherein the system controls at least one of second auxiliary loads, which is operated incompletely in the regenerative braking charge section, to operate to compensate for an incomplete operation in a drive motor discharge transition section.

7. The system of claim 1, wherein a first auxiliary load to be operated in a braking intention prediction section or a second auxiliary load to be operated in the driving motor discharge transition section is all of the plurality of auxiliary loads or a remainder of the plurality of auxiliary loads excluding one thereof.

* * * * *